United States Patent Office.

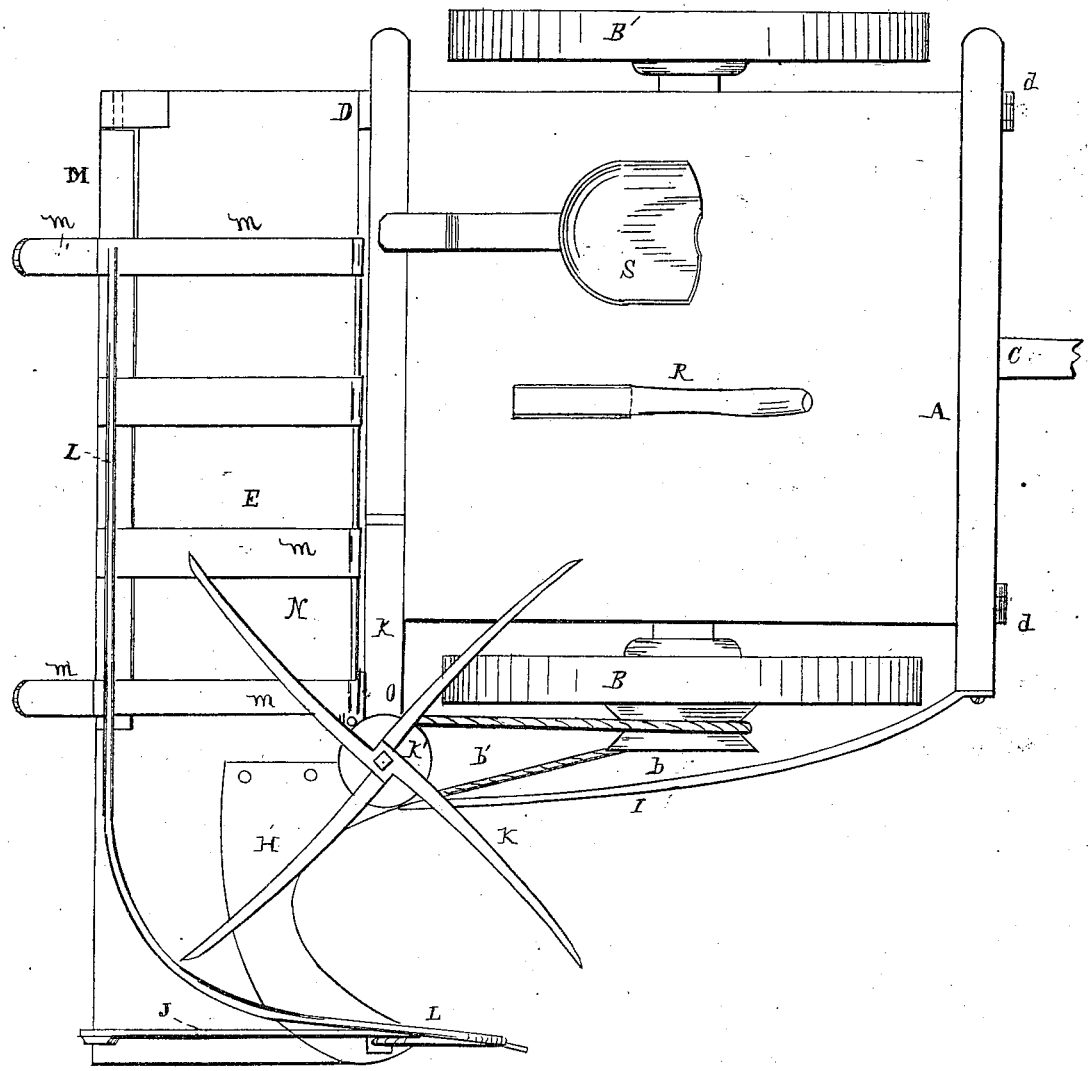

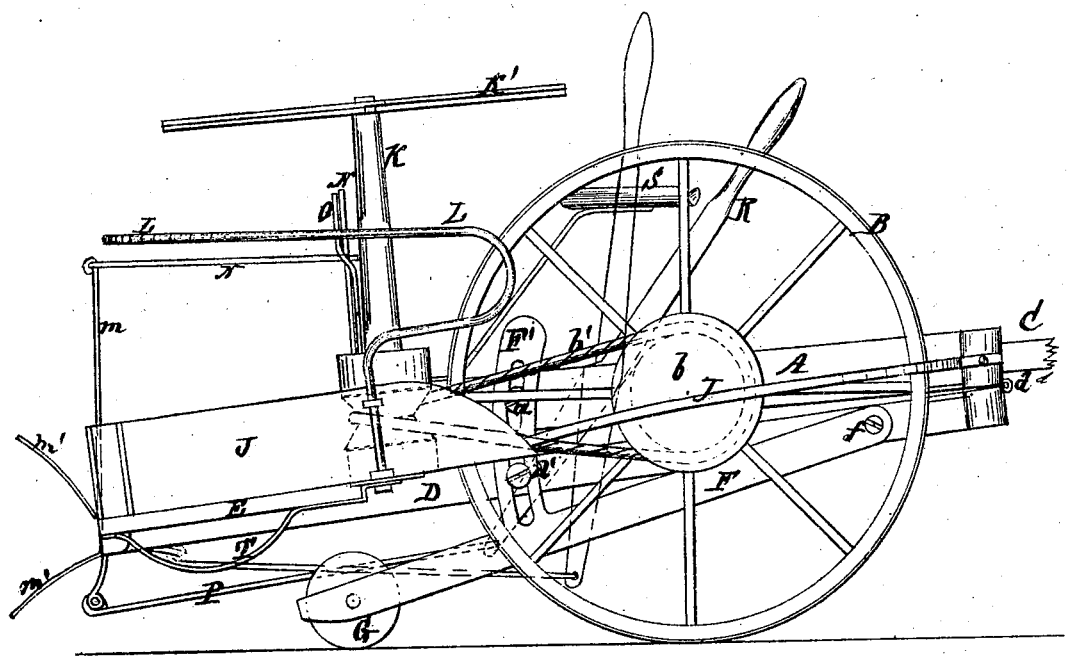

DAVID SARVER AND ROBERT COONS, OF GREENSBURG, PENNSYLVANIA.

Letters Patent No. 77,660, dated May 5, 1868.

IMPROVEMENT IN CORN-HARVESTERS.

*The Schedule referred to in these Letters Patent and making part of the same.*

TO ALL WHOM IT MAY CONCERN:

Be it known that we, DAVID SARVER and ROBERT COONS, both of Greensburg, in the county of Westmoreland, and State of Pennsylvania, have invented certain new and useful Improvements in Corn-Harvesters, of which the following is a full, clear, and exact description, reference being had to the accompanying drawings, which make part of this specification, and in which—

Figure 1 represents a plan or top view of a machine embracing our improvements, and Figure 2 a view, in elevation, of the same, as seen from the divider side of the machine.

The red lines in this figure show the attitude assumed by the dumping-apparatus at the moment of discharging the gavel.

It is the object of our invention to discharge the cut stalks from the machine in gavels suitable for binding, and in a position out of the way of the team in cutting the next swath; and to this end the improvements herein claimed consist—

First, in a novel method of constructing a cut-off, to receive the falling stalks while the completed gavel is being discharged, said cut-off having a movement substantially parallel to the path of the machine.

Second, in a novel method of combining a tilting-platform with a cut-off, vibrating endwise at a right angle to the axis of the platform, and parallel to the path of the machine.

Third, in a novel method of combining a guide, to deflect the cut stalks, a platform, to receive and discharge them, and a cut-off, to intercept the fall of the stalks cut during the discharge of the previously-accumulated gavel.

Fourth, in a novel method of combining with a reel, revolving on a vertical axis, or one nearly so, a tilting-platform, which drops the stalks swept upon it by the reel.

Fifth, in a novel method of combining, in a harvester, a laterally-projecting cutting-apparatus, to sever the stalks, a reel, to sweep the cut stalks backward, a guide, to deflect the cut stalks, a tilting-platform, to discharge them, and a cut-off, to be interposed during the tilting of the platform.

Sixth, in a novel method of combining a main frame, a supplementary frame, hinged to said main frame, and an interposed adjusting-arm, carrying a supporting-wheel.

In order to carry out the objects of our invention, we mount a stout main frame on proper supporting and driving-wheels. In rear of this main frame, we attach a platform, projecting laterally beyond the main frame, and carrying a cutting-apparatus, of any well-known construction, actuated by proper gearing from the driving-wheels. A vertical shaft on the platform carries horizontal arms, which serve to press the stalks against the cutting-apparatus, by which they are severed. When cut, the continued rotation of the reel-arms turns the stalks, which remain upright, and, by the aid of a curved guide, causes them to fall upon the platform at right angles to the path of the machine. This platform is pivoted, so as to tilt on an axis transverse to the path of the machine, and to drop the gavel upon the ground. It is operated by a compound lever, worked by the driver. A guard or cut-off is so connected with the tilting-platform that, as the gavel is discharged, the cut-off is interposed, to receive the falling stalks, and prevent them from falling upon the platform until the proper moment. After the gavel is discharged, the platform falls again, the cut-off is withdrawn, and the stalks fall upon the platform as before.

In the accompanying drawings, which show one practical way of carrying out our invention, a stout main frame, A, is shown as mounted on two supporting-wheels, B B', which may either turn loosely on a fixed axle, or be fixed on an axle turning in bearings in the frame, as preferred by the constructor. A tongue, C, projects from the front of this frame, in a proper position to regulate the side-draught. The platform E is secured upon a supplementary frame, D, the forward end of which is pivoted to the front of the main frame by hinges $d$, which allow the frame to play vertically, in order to raise or lower the cutting-apparatus and platform.

An arm, F, is pivoted, at $f$, to the supplementary frame, (so as to allow it to play vertically parallel with that frame,) and carries a roller, G, on its lower end. A bracket, F', projects upward from this arm. Set-screws $a$ and $d'$, upon the main and supplementary frames, enter vertical slots in this bracket, by which means we can leave the supplementary or platform-frame free to vibrate vertically on its pivots $d$, or vary the angle of the main frame, or the height of the supplementary frame, at will.

The platform E is solid, and projects laterally beyond the main frame on one side, in order to support the cutting-apparatus, which, in this instance, is shown as consisting of a fixed scythe, H. A brace, I, attached to the inner front corner of the main frame, and to the platform, near the heel of the cutter, serves to strengthen the platform.

A divider and grain-guard or fence, J, are mounted on the grain-end of the platform.

A vertical reel-post, K, is mounted, in suitable bearings, on an arm, $k$, projecting from the main frame, and rotated by a band, $b'$, encircling a pulley, $b$, on the inner driving-wheel, and a similar pulley, $k'$, on the reel-shaft. Cross-arms K' are mounted on the reel-shaft, and revolve with it.

A curved guide-rod, L, is secured to the divider-end of the platform, and curved, as shown in the drawings; that is to say, it is bent forwards, and then backwards over the divider, and then turned horizontally over and parallel to the rear edge of the platform. This rod, it will be perceived, is supported at the grain-end only, in order to leave an unobstructed space for the discharge of the stalks, as hereinafter explained.

A series of parallel slats or bars, $m$, are arranged, parallel to each other, upon a rock-shaft, M, turning in bearings in the back of the platform E. The rear ends $m'$ of these bars are turned up, to form a fence or guard, to prevent the premature dropping of the stalks, while their front ends are connected by a rod, N, turning in eyes in the bars. The grain-end of this rod is bent up at a right angle, and slides endwise through a hole in an arm, O, on the main frame. Thus, when the bars are thrown up perpendicularly, the rod extends across the platform about the level of the guide-rod, and intercepts the falling stalks. When the bars lie flat on the platform, the rod is vertical, and, consequently, out of the way, as it lies close to its arm O.

The grated platform is tilted by means of a hand-lever, R, pivoted on the main frame, and connected with the platform by a link-rod, P. This lever is worked by the driver from his seat S. The platform might, however, be tilted by a foot-lever as well.

In operation, as the standing stalks are severed by the cutting-apparatus, they are swept back by the reel and guide-rod, and caused to fall upon the grated platform. When a gavel of sufficient size has accumulated, the driver seizes the lever R, and tilts the grating into the position shown in red in fig. 2, when the stalks are discharged upon the ground. As the guide-rod L has no support at the stubble-end, the long stalks may be discharged without obstruction. As the grating tilts, the cut-off N is thrown across the space between the guide-rod L and the reel, through which the falling stalks must pass, and thus intercepts the stalks which fall during the discharge of the grain. As the grating is lowered, the cut-off drops, and allows the cut stalks resting against it to fall upon the grating.

The roller G holds up the platform, and prevents the link-rod P from striking the ground. The shoes T also keep the platform from contact with the ground.

What we claim as our invention, and desire to secure by Letters Patent, is—

1. A cut-off, N, having an endwise movement parallel to the path of the machine, substantially as set forth.

2. The combination, substantially as set forth, with a tilting-platform, of a cut-off, vibrating endwise at a right angle to the axis of the platform, and parallel to the path of the machine.

3. The combination, substantially as set forth, with a tilting-platform and a cut-off, of a guide or deflector, supported at the grain-end only.

4. The combination and arrangement, as set forth, with the reel, revolving on a vertical axis, of the tilting-platform.

5. The combination, substantially as set forth, of a laterally-projecting cutting-apparatus, a reel, revolving on a vertical axis, a guide, a cut-off, and a tilting-platform.

6. The combination, substantially as set forth, of the main frame and supplementary frame with the roller-arm F and bracket F', for the purposes set forth.

In testimony whereof, we have hereunto subscribed our names.

DAVID SARVER,
ROBERT COONS.

Witnesses:
  R. W. SINGER,
  DAVID M. SARVER.